United States Patent
Kim et al.

(10) Patent No.: US 10,780,897 B2
(45) Date of Patent: Sep. 22, 2020

(54) METHOD AND DEVICE FOR SIGNALING PRESENT DRIVING INTENTION OF AUTONOMOUS VEHICLE TO HUMANS BY USING VARIOUS V2X-ENABLED APPLICATION

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

(*) Notice: Subject to any disclaimer, the term of this patent is extended or adjusted under 35 U.S.C. 154(b) by 0 days.

(21) Appl. No.: 16/732,009

(22) Filed: Dec. 31, 2019

(65) Prior Publication Data
US 2020/0247434 A1    Aug. 6, 2020

Related U.S. Application Data

(60) Provisional application No. 62/799,259, filed on Jan. 31, 2019.

(51) Int. Cl.
G08G 1/16    (2006.01)
G06T 19/00    (2011.01)
(Continued)

(52) U.S. Cl.
CPC ....... *B60W 60/00274* (2020.02); *B60Q 1/503* (2013.01); *B60Q 5/00* (2013.01);
(Continued)

(58) Field of Classification Search
CPC .......... B60W 30/00274; B60W 30/09; B60W 30/095; G06T 19/00; G08G 1/00;
(Continued)

(56) References Cited

U.S. PATENT DOCUMENTS

| | | | | |
|---|---|---|---|---|
| 2,400,655 A | * | 5/1946 | Sala | B60Q 1/26 340/470 |
| 8,954,252 B1 | * | 2/2015 | Urmson | G08G 1/167 701/70 |

(Continued)

OTHER PUBLICATIONS

Extended European Search Report issued in EP Patent Application No. 20153074.8 dated Jul. 3, 2020.

*Primary Examiner* — Yuri Kan
(74) *Attorney, Agent, or Firm* — Kaplan Breyer Schwarz, LLP (57) ABSTRACT

A method for signaling a driving intention of an autonomous vehicle is provided. The method includes steps of: a driving intention signaling device (a) detecting a pedestrian ahead of the autonomous vehicle using surroundings video images, and determining whether the pedestrian crosses a roadway using a virtual crosswalk; (b) if the pedestrian crosses the roadway, estimating a crosswalking trajectory, corresponding to an expected path of the pedestrian, by referring to a moving trajectory of the pedestrian, setting a driving plan of the autonomous vehicle referring to driving information and the crosswalking trajectory, and allowing the autonomous vehicle to self-drive by the driving plan; and (c) determining whether the pedestrian pays attention to the autonomous vehicle by referring to gaze patterns and, if not, allowing
(Continued)

delivery of the driving intention to the pedestrian and/or a nearby driver, via an external display and/or an external speaker.

18 Claims, 5 Drawing Sheets

(51) Int. Cl.
| | |
|---|---|
| *G08G 1/00* | (2006.01) |
| *G06F 11/10* | (2006.01) |
| *A63F 13/10* | (2006.01) |
| *B60W 30/09* | (2012.01) |
| *B60Q 1/38* | (2006.01) |
| *B60Q 1/44* | (2006.01) |
| *B60W 60/00* | (2020.01) |
| *G05D 1/02* | (2020.01) |
| *B60Q 1/50* | (2006.01) |
| *B60Q 5/00* | (2006.01) |

(52) U.S. Cl.
CPC ....... *B60W 60/0017* (2020.02); *G05D 1/0212* (2013.01); *G05D 1/0231* (2013.01); *B60W 2520/06* (2013.01); *B60W 2520/10* (2013.01); *B60W 2520/105* (2013.01); *B60W 2554/4029* (2020.02)

(58) Field of Classification Search
CPC .. G08G 1/01; G08G 1/16; A63F 13/10; G06F 11/10; B60Q 1/44; B60Q 1/387; G06Q 30/02
See application file for complete search history.

(56) References Cited

U.S. PATENT DOCUMENTS

| | | | |
|---|---|---|---|
| 10,347,132 B1* | 7/2019 | Chandrakumar | G08G 1/161 |
| 2004/0110565 A1* | 6/2004 | Levesque | A63F 13/10 |
| | | | 463/42 |
| 2009/0143966 A1* | 6/2009 | Jacobson | G08G 1/0104 |
| | | | 701/118 |
| 2009/0319163 A1* | 12/2009 | Sutter | G08G 1/0104 |
| | | | 701/117 |
| 2014/0240351 A1* | 8/2014 | Scavezze | G06F 3/011 |
| | | | 345/633 |
| 2015/0094878 A1* | 4/2015 | Miura | B60W 30/09 |
| | | | 701/1 |
| 2018/0276706 A1* | 9/2018 | Hoffman | G06F 3/0304 |
| 2018/0319325 A1* | 11/2018 | Tatara | B60Q 1/50 |
| 2018/0326982 A1* | 11/2018 | Paris | B60W 50/0097 |
| 2019/0139414 A1* | 5/2019 | Morimura | G08G 1/166 |
| 2020/0019457 A1* | 1/2020 | Takano | G02B 27/0101 |

\* cited by examiner

METHOD AND DEVICE FOR SIGNALING PRESENT DRIVING INTENTION OF AUTONOMOUS VEHICLE TO HUMANS BY USING VARIOUS V2X-ENABLED APPLICATION

CROSS REFERENCE TO RELATED APPLICATION

This application claims the benefit of priority to U.S. Provisional Patent Application No. 62/799,259, filed on Jan. 31, 2019, the entire contents of which being incorporated herein by reference.

FIELD OF THE DISCLOSURE

The present disclosure relates to a method and a device for signaling a current driving intention of an autonomous vehicle to others; and more particularly, to the method and the device for setting a driving plan of the autonomous vehicle by estimating a crosswalking trajectory of a pedestrian crossing a roadway of the autonomous vehicle, and if the pedestrian is not paying attention to the autonomous vehicle, allowing the pedestrian to be aware of a driving intention of the autonomous vehicle via at least one of an external display and an external speaker.

BACKGROUND OF THE DISCLOSURE

Autonomous vehicles use various computing systems to aid in transport of passengers from one location to another. Some autonomous vehicles may require some initial input or continuous input from an operator, such as a pilot, driver, or passenger. Other systems, for example, autopilot systems, may be used only when the system has been engaged, which permits the operator to switch from a manual driving mode (where the operator exercises a high degree of control over a movement of the vehicle) to an autonomous driving mode (where the vehicle essentially drives itself).

Such vehicles are typically equipped with various types of sensors in order to detect objects in the environment. For example, autonomous vehicles may include lasers, sonar, radar, cameras, and other devices which scan and record data from the vehicle's environment. Sensor data from one or more of these devices may be used to detect objects and their respective characteristics (position, shape, heading, speed, etc.).

A typical driver may communicate with pedestrians to express their intent in a number of different ways including make eye-contact, use hand gestures and other forms of communication. In this regard, a driver may let a pedestrian know that it is safe to cross the road. However, other than signaling devices typical to non-autonomous vehicles, such as turn signals, head lights, high beams, brake lights, reverse lights, and some audible signals (horns, reverse light beepers, etc.), autonomous vehicles lack the capability to directly communicate the vehicle's future behavior. In addition, while it may be sufficient for a driver to slow down or stop a vehicle at a cross walk in addition to making eye contact with, waving to, speaking to, or flashing lights to a pedestrian to communicate to the pedestrian that the driver will wait for the pedestrian to cross, simply stopping a vehicle without these driver-initiated signals may not be sufficiently reassuring to the pedestrian that it is indeed safe to cross.

Therefore, the inventors of the present disclosure propose a method for efficiently signaling a current driving intention of the autonomous vehicle to people.

SUMMARY OF THE DISCLOSURE

It is an object of the present disclosure to solve all the aforementioned problems.

It is another object of the present disclosure to allow at least one pedestrian or at least one passenger to recognize a driving intention of an autonomous vehicle in operation.

It is still another object of the present disclosure to acquire optimal information to be used for transmitting a signal, representing the driving intention of the autonomous vehicle in operation, to the pedestrian or the passenger.

It is still yet another object of the present disclosure to efficiently transmit the signal, representing the driving intention of the autonomous vehicle in operation, to the pedestrian or the passenger.

In accordance with one aspect of the present disclosure, there is provided a method for signaling at least one driving intention of an autonomous vehicle, including steps of: (a) a driving intention signaling device performing a process of detecting one or more pedestrians located in a nearby front area of the autonomous vehicle by using at least one surroundings video image of the autonomous vehicle, and a process of determining whether a specific pedestrian among the pedestrians crosses a roadway where the autonomous vehicle is traveling by using a virtual crosswalk corresponding to one of locations of the pedestrians; (b) if the specific pedestrian is determined as crossing the roadway, the driving intention signaling device performing a process of estimating at least one crosswalking trajectory, corresponding to at least one expected path by which the specific pedestrian is to cross the roadway, by referring to at least one moving trajectory of the specific pedestrian, a process of setting at least one driving plan of the autonomous vehicle by referring to driving information of the autonomous vehicle and the crosswalking trajectory, and a process of allowing the autonomous vehicle to be driven according to the driving plan; and (c) the driving intention signaling device performing a process of determining whether the specific pedestrian is paying attention to the autonomous vehicle by referring to one or more gaze patterns of the specific pedestrian using the surroundings video image, and a process of, if the specific pedestrian is determined as not paying attention to the autonomous vehicle, allowing the driving intention of the autonomous vehicle corresponding to the driving plan to be delivered to at least one of (i) the specific pedestrian and (ii) at least one driver of at least one nearby vehicle, via at least one of an external display and an external speaker installed on the autonomous vehicle.

As one example, at the step of (c), the driving intention signaling device performs a process of determining the specific pedestrian as not paying attention to the autonomous vehicle by referring to the gaze patterns of the specific pedestrian, (i) if an accumulated sum of one or more gaze time sections during a preset reference time is equal to or less than a first preset threshold wherein each gaze time section represents a time while a gaze of the specific pedestrian stays on the autonomous vehicle, or (ii) if the gaze of the specific pedestrian stays off the autonomous vehicle for a time equal to or greater than a second preset threshold after switching between staying on the autonomous vehicle and staying off the autonomous vehicle.

As one example, the driving intention signaling device performs a process of determining the specific pedestrian as paying attention to the autonomous vehicle, (iii) if the accumulated sum of the gaze time sections during the preset reference time is larger than the first preset threshold wherein each gaze time section represents a time while the gaze of the specific pedestrian stays on the autonomous vehicle, or (iv) if the gaze of the specific pedestrian stays on the autonomous vehicle for a time equal to or greater than a third preset threshold after switching between staying on the autonomous vehicle and staying off the autonomous vehicle.

As one example, at the step of (a), on condition (i) that the virtual crosswalk has been created such that the virtual crosswalk includes first regions, corresponding to a width of the roadway, whose each side reaches from each boundary between the roadway and each sidewalk to a first distance toward said each sidewalk, and second regions which are additional regions chosen by referring to each certain point on said each of the first regions and (ii) that a central axis in a crosswise direction of the virtual crosswalk corresponds to a location of the specific pedestrian, the driving intention signaling device performs a process of determining the specific pedestrian as crossing the roadway if the specific pedestrian is located in one of the first regions, and a process of determining the specific pedestrian as intending to cross the roadway if the specific pedestrian is located in one of the second regions.

As one example, at the step of (b), the driving intention signaling device performs a process of estimating the crosswalking trajectory of the specific pedestrian (i) by using a constant acceleration model with a limited maximum speed in a primary spatial section far away from a termination point of crosswalking by more than a second distance toward the roadway, and (ii) by using the constant acceleration model with a preset negative acceleration and a constant moving direction of the specific pedestrian in a secondary spatial section from the termination point of crosswalking to less than the second distance toward the roadway, by referring to a moving velocity and an acceleration of the specific pedestrian.

As one example, the driving intention signaling device performs a process of setting the driving plan by estimating a driving path, acceleration information, deceleration information, and steering information such that the autonomous vehicle avoids the crosswalking trajectory of the specific pedestrian, the autonomous vehicle poses no apparent threat to the specific pedestrian, or the autonomous vehicle violates no traffic regulations, by referring to a location, a moving direction, a speed, and a braking distance of the autonomous vehicle.

As one example, on condition that a 1-st action plan to a j-th action plan corresponding to at least part of acceleration, deceleration, and steering of the autonomous vehicle are set, and on condition that n steps are set per preset time intervals, wherein j is an integer larger than 0, and n is an integer larger than 0, the driving intention signaling device performs a process of setting the driving plan of the autonomous vehicle by referring to a 1-st optimal action plan to an n-th optimal action plan, each of which is selected from the 1-st action plan to the j-th action plan at its corresponding each of the n steps, via repeating a process of estimating a specific action plan, as a k-th optimal action plan at a k-th step, which minimizes a pedestrian-injuring cost, a pedestrian-threatening cost, a law-violating cost, and a ride-quality cost among a 1-st piece of driving information to a j-th piece of the driving information of the autonomous vehicle, wherein the 1-st piece to the j-th piece of the driving information are expected to result respectively if the 1-st action plan to the j-th action plan are executed based on a (k−1)-th piece of the driving information of the autonomous vehicle corresponding to a (k−1)-th optimal action plan estimated at a (k−1)-th step, and wherein k is an integer larger than 0 and equal to or less than n.

As one example, at the step of (c), the driving intention signaling device performs a process of displaying at least part of colors, symbols, text, and emojis corresponding to the driving intention, via the external display.

As one example, at the step of (c), the driving intention signaling device performs a process of determining whether at least one passenger of the autonomous vehicle is paying attention to the nearby front area of the autonomous vehicle or the specific pedestrian by referring to one or more gaze patterns of the passenger using at least one interior image of the autonomous vehicle, and a process of, if the passenger is determined as not paying attention to the nearby front area of the autonomous vehicle or the specific pedestrian, allowing the driving intention of the autonomous vehicle corresponding to the driving plan to be delivered to the passenger, via at least one of an internal display and an internal speaker installed on the autonomous vehicle.

In accordance with another aspect of the present disclosure, there is provided a driving intention signaling device for signaling at least one driving intention of an autonomous vehicle, including: at least one memory that stores instructions; and at least one processor configured to execute the instructions to perform or support another device to perform: (I) a process of detecting one or more pedestrians located in a nearby front area of the autonomous vehicle by using at least one surroundings video image of the autonomous vehicle, and a process of determining whether a specific pedestrian among the pedestrians crosses a roadway where the autonomous vehicle is traveling by using a virtual crosswalk corresponding to one of locations of the pedestrians, (II) if the specific pedestrian is determined as crossing the roadway, a process of estimating at least one crosswalking trajectory, corresponding to at least one expected path by which the specific pedestrian is to cross the roadway, by referring to at least one moving trajectory of the specific pedestrian, a process of setting at least one driving plan of the autonomous vehicle by referring to driving information of the autonomous vehicle and the crosswalking trajectory, and a process of allowing the autonomous vehicle to be driven according to the driving plan, and (III) a process of determining whether the specific pedestrian is paying attention to the autonomous vehicle by referring to one or more gaze patterns of the specific pedestrian using the surroundings video image, and a process of, if the specific pedestrian is determined as not paying attention to the autonomous vehicle, allowing the driving intention of the autonomous vehicle corresponding to the driving plan to be delivered to at least one of (III-1) the specific pedestrian and (III-2) at least one driver of at least one nearby vehicle, via at least one of an external display and an external speaker installed on the autonomous vehicle.

As one example, at the process of (III), the processor performs a process of determining the specific pedestrian as not paying attention to the autonomous vehicle by referring to the gaze patterns of the specific pedestrian, (i) if an accumulated sum of one or more gaze time sections during a preset reference time is equal to or less than a first preset threshold wherein each gaze time section represents a time while a gaze of the specific pedestrian stays on the autonomous vehicle, or (ii) if the gaze of the specific pedestrian stays off the autonomous vehicle for a time equal to or greater than a second preset threshold after switching between staying on the autonomous vehicle and staying off the autonomous vehicle.

As one example, the processor performs a process of determining the specific pedestrian as paying attention to the autonomous vehicle, (iii) if the accumulated sum of the gaze time sections during the preset reference time is larger than the first preset threshold wherein each gaze time section represents a time while the gaze of the specific pedestrian stays on the autonomous vehicle, or (iv) if the gaze of the specific pedestrian stays on the autonomous vehicle for a time equal to or greater than a third preset threshold after switching between staying on the autonomous vehicle and staying off the autonomous vehicle.

As one example, at the process of (I), on condition (i) that the virtual crosswalk has been created such that the virtual crosswalk includes first regions, corresponding to a width of the roadway, whose each side reaches from each boundary between the roadway and each sidewalk to a first distance toward said each sidewalk, and second regions which are additional regions chosen by referring to each certain point on said each of the first regions and (ii) that a central axis in a crosswise direction of the virtual crosswalk corresponds to a location of the specific pedestrian, the processor performs a process of determining the specific pedestrian as crossing the roadway if the specific pedestrian is located in one of the first regions, and a process of determining the specific pedestrian as intending to cross the roadway if the specific pedestrian is located in one of the second regions.

As one example, at the process of (II), the processor performs a process of estimating the crosswalking trajectory of the specific pedestrian (i) by using a constant acceleration model with a limited maximum speed in a primary spatial section far away from a termination point of crosswalking by more than a second distance toward the roadway, and (ii) by using the constant acceleration model with a preset negative acceleration and a constant moving direction of the specific pedestrian in a secondary spatial section from the termination point of crosswalking to less than the second distance toward the roadway, by referring to a moving velocity and an acceleration of the specific pedestrian.

As one example, the processor performs a process of setting the driving plan by estimating a driving path, acceleration information, deceleration information, and steering information such that the autonomous vehicle avoids the crosswalking trajectory of the specific pedestrian, the autonomous vehicle poses no apparent threat to the specific pedestrian, or the autonomous vehicle violates no traffic regulations, by referring to a location, a moving direction, a speed, and a braking distance of the autonomous vehicle.

As one example, on condition that a 1-st action plan to a j-th action plan corresponding to at least part of acceleration, deceleration, and steering of the autonomous vehicle are set, and on condition that n steps are set per preset time intervals, wherein j is an integer larger than 0, and n is an integer larger than 0, the processor performs a process of setting the driving plan of the autonomous vehicle by referring to a 1-st optimal action plan to an n-th optimal action plan, each of which is selected from the 1-st action plan to the j-th action plan at its corresponding each of the n steps, via repeating a process of estimating a specific action plan, as a k-th optimal action plan at a k-th step, which minimizes a pedestrian-injuring cost, a pedestrian-threatening cost, a law-violating cost, and a ride-quality cost among a 1-st piece of driving information to a j-th piece of the driving information of the autonomous vehicle, wherein the 1-st piece to the j-th piece of the driving information are expected to result respectively if the 1-st action plan to the j-th action plan are executed based on a (k−1)-th piece of the driving information of the autonomous vehicle corresponding to a (k−1)-th optimal action plan estimated at a (k−1)-th step, and wherein k is an integer larger than 0 and equal to or less than n.

As one example, at the process of (III), the processor performs a process of displaying at least part of colors, symbols, text, and emojis corresponding to the driving intention, via the external display.

As one example, at the process of (III), the processor performs a process of determining whether at least one passenger of the autonomous vehicle is paying attention to the nearby front area of the autonomous vehicle or the specific pedestrian by referring to one or more gaze patterns of the passenger using at least one interior image of the autonomous vehicle, and a process of, if the passenger is determined as not paying attention to the nearby front area of the autonomous vehicle or the specific pedestrian, allowing the driving intention of the autonomous vehicle corresponding to the driving plan to be delivered to the passenger, via at least one of an internal display and an internal speaker installed on the autonomous vehicle.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

Figure 1:
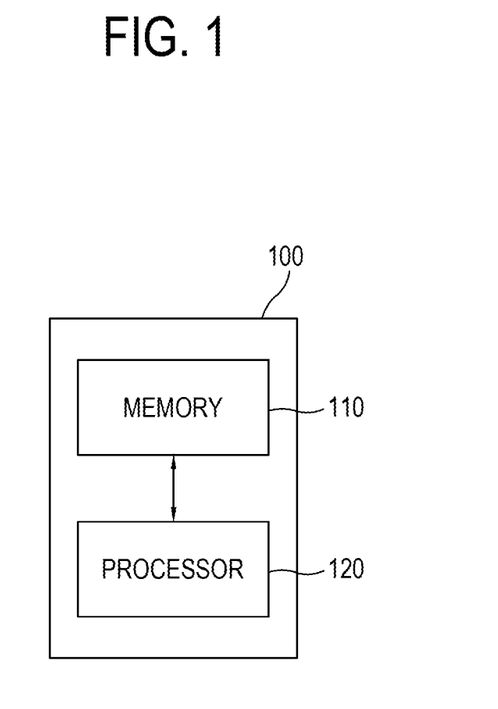
FIG. 1 is a drawing schematically illustrating a driving intention signaling device for signaling at least one driving intention of an autonomous vehicle in accordance with one example embodiment of the present disclosure.

FIG. 1 is a drawing schematically illustrating a driving intention signaling device for signaling at least one driving intention of an autonomous vehicle in accordance with one example embodiment of the present disclosure. By referring to FIG. 1, the driving intention signaling device 100 may include a memory 110 for storing instructions to estimate at least one crosswalking trajectory of at least one pedestrian who intends to cross a roadway, allow the autonomous vehicle according to at least one driving plan of the autonomous vehicle by setting the driving plan in response to the crosswalking trajectory, and signal the driving intention of the autonomous vehicle if the pedestrian is not paying attention to the autonomous vehicle, and a processor 120 for performing processes corresponding to the instructions in the memory 110 to signal the driving intention of the autonomous vehicle.

Specifically, the driving intention signaling device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

A method for signaling the driving intention of the autonomous vehicle by using the driving intention signaling device 100 in accordance with one example of the present disclosure is described by referring to FIGS. 2 to 6 as follows.

Figure 2:
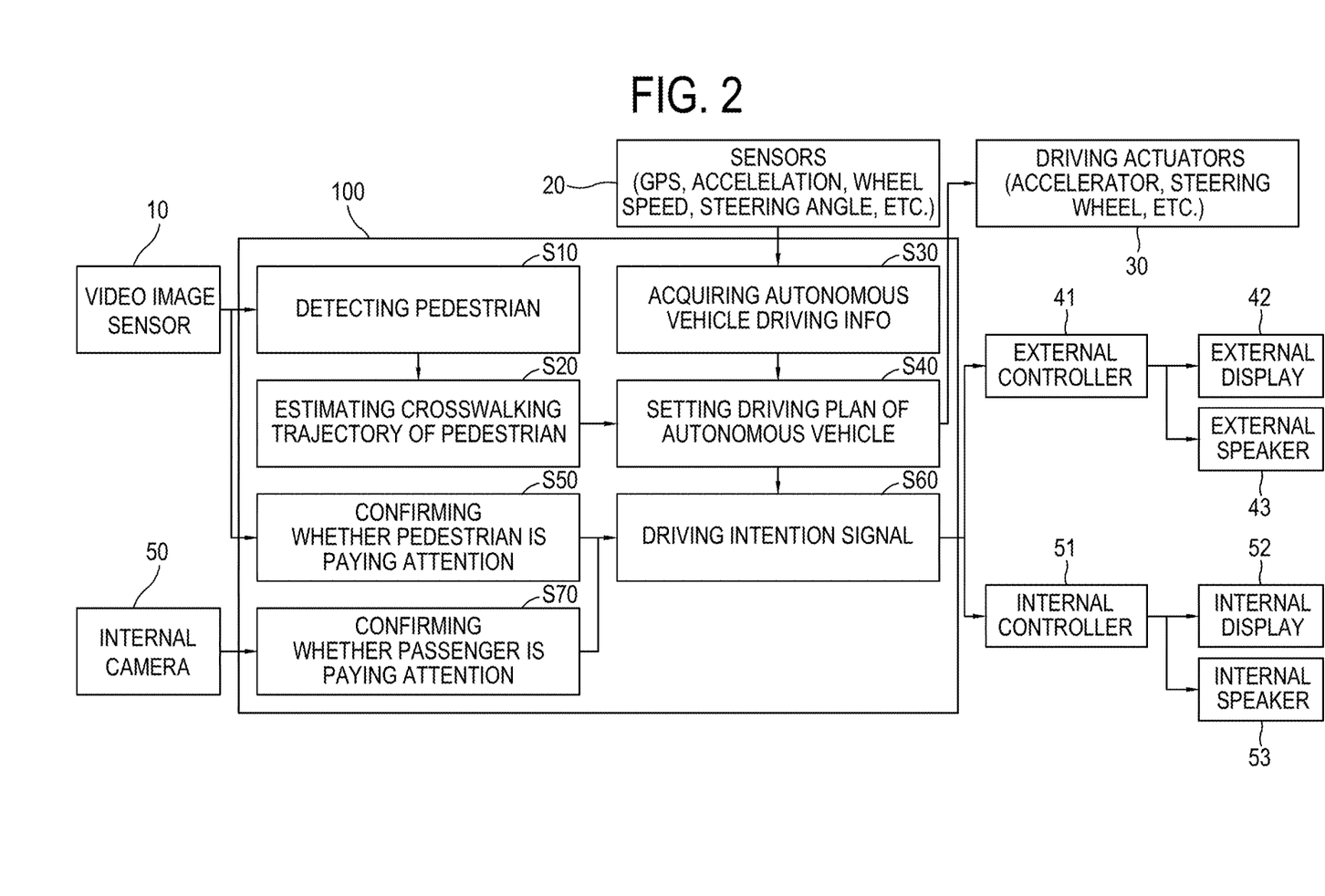
FIG. 2 is a drawing schematically illustrating a method for signaling the driving intention of the autonomous vehicle in accordance with one example embodiment of the present disclosure.

First, by referring to FIG. 2, the driving intention signaling device 100 may detect the pedestrian located in a nearby front area of the autonomous vehicle by using at least one surroundings video image of the autonomous vehicle at a step of S10. Herein, the nearby front area of the autonomous vehicle may represent a nearby area in a forward direction of the autonomous vehicle, and the surroundings video image may be an image of surrounding environment of the autonomous vehicle.

Herein, the driving intention signaling device 100 may acquire the surroundings video image of the autonomous vehicle from at least one video image sensor 10 and may detect the pedestrian by using the surroundings video image. And, the video image sensor 10 may include at least one external camera shooting the surrounding environment of the autonomous vehicle, at least one LiDAR, and at least one radar, but the scope of the present disclosure is not limited thereto, and may include any sensors capable of scanning and converting the surrounding environment of the autonomous vehicle into an image.

Meanwhile, the driving intention signaling device 100 may utilize a deep learning network such as a convolutional neural network, etc. to detect the pedestrian from the surroundings video image.

And, the driving intention signaling device 100 may perform a process of determining whether a specific pedestrian among one or more detected pedestrians crosses the roadway where the autonomous vehicle is traveling by using a virtual crosswalk corresponding to one of locations of the pedestrians.

Figure 3:
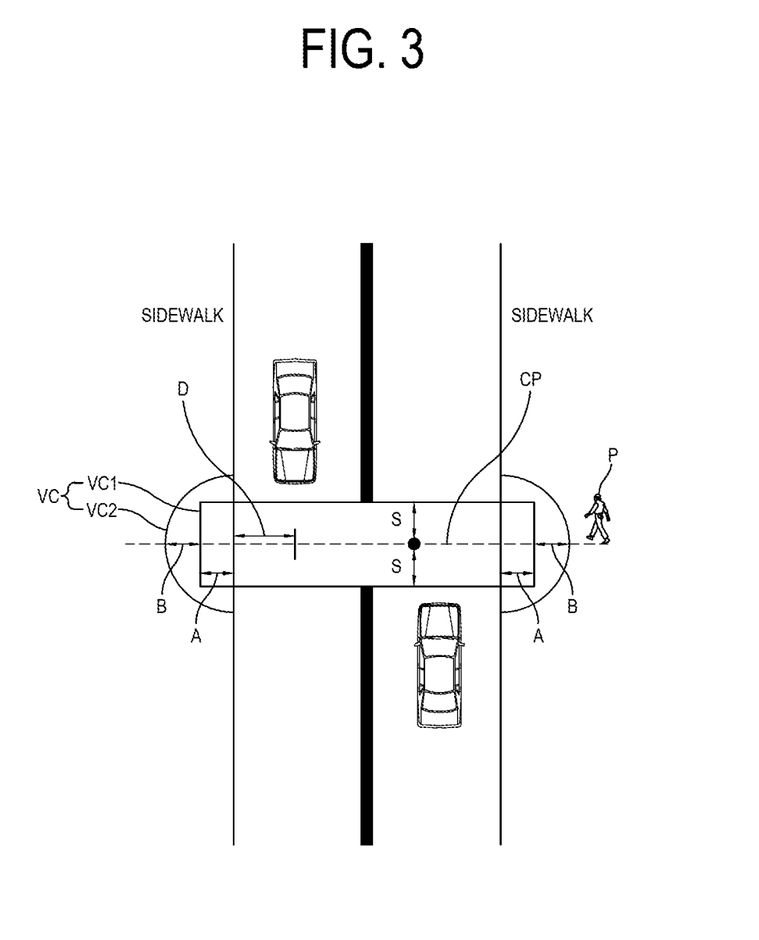
FIG. 3 is a drawing schematically illustrating a process of confirming at least one pedestrian crossing a roadway in the method for signaling the driving intention of the autonomous vehicle in accordance with one example embodiment of the present disclosure.

As one example, if the specific pedestrian P in the nearby front area of the autonomous vehicle is detected as in FIG. 3, the virtual crosswalk VC may be created such that a central axis CP in a lengthwise direction, i.e., transverse to the roadway, of the virtual crosswalk VC corresponds to a location of the specific pedestrian P, to thereby determine whether the specific pedestrian P is crossing the roadway where the autonomous vehicle is traveling.

Herein, the virtual crosswalk VC may correspond to an actual crosswalk on the roadway, but the scope of the present disclosure is not limited thereto, and may apply to a case of the specific pedestrian P crossing the roadway where no crosswalk is present.

Meanwhile, the virtual crosswalk VC may be set as including first regions VC1, corresponding to a width of the roadway, whose each side reaches from each boundary between the roadway and each sidewalk to a first distance A toward said each sidewalk, and second regions VC2 which are additional regions each of which (i) is on each sidewalk, (ii) encloses each of the first regions VC1, and (iii) excludes each of the first regions VC1. Herein, as one example, each of the second regions VC2 near the central axis CP of the virtual crosswalk VC may be set as each of areas on each sidewalk within a radius, equal to the first distance A plus a preset distance B, from each end point on the central axis CP where the central axis CP meets each boundary, with each of the first regions VC1 being excluded. Also, the virtual crosswalk VC may be set as an area within a preset width S from the central axis CP in both directions transverse to the central axis CP, in order to maintain a minimal distance S of the pedestrian from the autonomous vehicle such that the pedestrian does not feel threatened.

And, the driving intention signaling device 100 may perform a process of determining the specific pedestrian P as crossing the roadway if the specific pedestrian P is determined as located in one of the first regions VC1 of the virtual crosswalk VC, and a process of determining the specific pedestrian P as intending to cross the roadway if the specific pedestrian P is determined as located in one of the second regions VC2 of the virtual crosswalk VC. However, if the specific pedestrian P is determined as not located in any of the first regions VC1 and the second regions VC2 of the virtual crosswalk VC, then the specific pedestrian P may be determined as not crossing the roadway.

That is, if the specific pedestrian P is determined as located on the roadway, or as located at one of VC1, then the specific pedestrian P may be determined as crossing or starting to cross the roadway. And, if the specific pedestrian P is determined as located at one of VC2, then the specific pedestrian P may be determined as intending to cross the roadway but not yet started crossing the roadway.

Next, if the specific pedestrian is determined as crossing the roadway, the driving intention signaling device 100 may perform a process of estimating at least one crosswalking trajectory corresponding to at least one expected path by which the specific pedestrian is to cross the roadway, by referring to at least one moving trajectory of the specific pedestrian, at a step of S20.

As one example, the driving intention signaling device 100 may track the specific pedestrian P detected in the surroundings video image, to thereby estimate the crosswalking trajectory of the specific pedestrian P, by referring to an acquired moving velocity and an acquired acceleration of the specific pedestrian P.

Herein, by referring to FIG. 3, the driving intention signaling device 100 may perform a process of estimating the crosswalking trajectory of the specific pedestrian (i) by using a constant acceleration model with a limited maximum speed in a primary spatial section far away from a termination point of crosswalking, i.e., the boundary between the roadway and the opposite side of sidewalk, by more than a second distance D toward the roadway, and (ii) by using the constant acceleration model with a preset negative acceleration and a constant moving direction of the specific pedestrian in a secondary spatial section from the termination point of crosswalking to less than the second distance D toward the roadway, by referring to the moving velocity and the acceleration of the specific pedestrian. Herein, the constant moving direction may be a maintained direction of the moving velocity of the specific pedestrian P.

That is, the driving intention signaling device 100 may estimate the crosswalking trajectory using the constant acceleration model which uses the moving velocity and the acceleration of the specific pedestrian P, and specifically, for example, may use the constant acceleration model where (i) a maximum speed of the specific pedestrian P is limited within a certain spatial section, and (ii) the specific pedestrian P decelerates near the termination point of crosswalking.

Next, the driving intention signaling device 100 may perform a process of setting at least one driving plan of the autonomous vehicle by referring to driving information of the autonomous vehicle and the crosswalking trajectory of the specific pedestrian, and a process of allowing the autonomous vehicle to be driven according to the driving plan.

As one example, the driving intention signaling device 100 may acquire the driving information of the autonomous vehicle at a step of S30 including a location of the autonomous vehicle, a moving direction of the autonomous vehicle, a speed of the autonomous vehicle, a braking distance of the autonomous vehicle, etc. by referring to sensor information, e.g., GPS information, acceleration information, a wheel speed, a steering angle, etc. acquired from one or more sensors 20 of the autonomous vehicle.

Next, the driving intention signaling device 100 may perform a process of setting the driving plan of the autonomous vehicle by referring to the driving information of the autonomous vehicle and the crosswalking trajectory of the specific pedestrian at a step of S40, and a process of allowing the autonomous vehicle to be driven by operating one or more driving actuators 30 of the autonomous vehicle according to the driving plan.

That is, the driving intention signaling device 100 may perform a process of setting the driving plan of the autonomous vehicle by estimating an expected driving path, deceleration information, and steering information of the autonomous vehicle such that the autonomous vehicle avoids the crosswalking trajectory of the specific pedestrian, the autonomous vehicle poses no apparent threat to the specific pedestrian, or the autonomous vehicle violates no traffic regulations, by referring to the location, the moving direction, the speed, and the braking distance of the autonomous vehicle.

Figure 4:
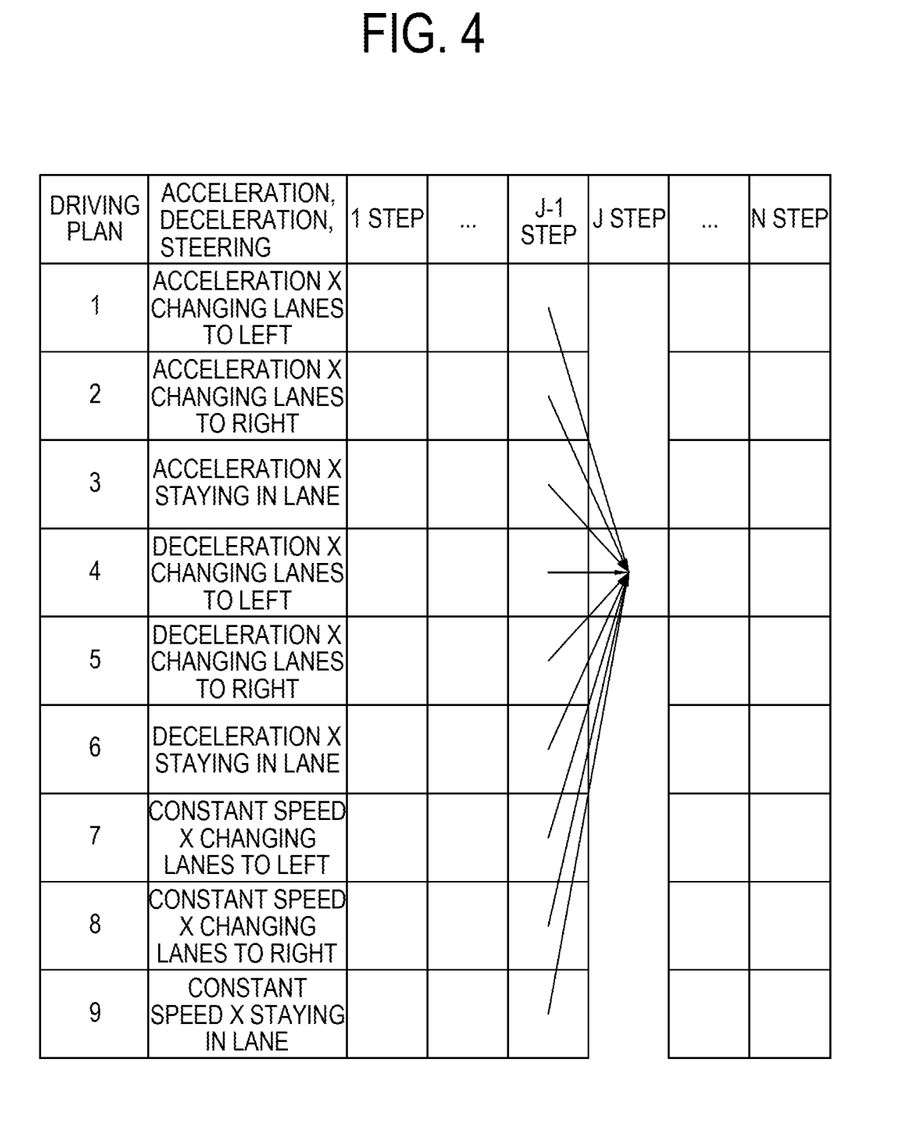
FIG. 4 is a drawing schematically illustrating a process of setting one or more driving plans of the autonomous vehicle in the method for signaling the driving intention of the autonomous vehicle in accordance with one example embodiment of the present disclosure.

Herein, by referring to FIG. 4, on condition that a 1-st action plan to a j-th action plan corresponding to at least part of acceleration, deceleration, and steering of the autonomous vehicle are set, and on condition that n steps are set per preset time intervals, the driving intention signaling device 100 may perform a process of setting the driving plan of the autonomous vehicle by referring to a 1-st optimal action plan to an n-th optimal action plan each of which is selected from the 1-st action plan to the j-th action plan at its corresponding each of the n steps, via repeating a process of estimating a specific action plan, as a k-th optimal action plan at a k-th step, which minimizes a pedestrian-injuring cost, a pedestrian-threatening cost, a law-violating cost, and a ride-quality cost among a 1-st piece of the driving information to a j-th piece of the driving information of the autonomous vehicle, where the 1-st piece to the j-th piece of the driving information are expected to result respectively if the 1-st action plan to the j-th action plan are executed based on a (k−1)-th piece of the driving information of the autonomous vehicle corresponding to a (k−1)-th optimal action plan estimated at a (k−1)-th step. Herein, j may be an integer larger than 0, n may be an integer larger than 0, and k may be an integer larger than 0 and equal to or less than n.

As one example, the driving intention signaling device 100 may determine a combination of (i) three actions, i.e., the acceleration, the deceleration, the constant speed, and (ii) other three actions, i.e., changing lanes to the left, changing lanes to the right, staying in the lane, that is, a total of nine action plans, per the preset time intervals T and may determine optimal action plans by computation of the action plans as many as the n steps, i.e., T×n times, in the future from a current point of time, at each of the time intervals T. Herein, a total number of cases may be 9 to the power of n. Further, the present disclosure may not be limited to the preset time intervals T. That is, the time intervals may be varied as the case may be.

Herein, the driving intention signaling device 100 may create a 9×n table by dynamic programming, where columns represent the n steps and rows represent 9 action plans. Then, a specific row in a specific column may represent a minimal cost that can result if at least part of the acceleration, the deceleration, and the steering is performed according to the action plan of the corresponding row at the corresponding step, which may be expressed by an equation as follows.

$$\text{minimal cost}(i\text{-th row}, j\text{-th column}) = \min \text{ for all } k \text{ rows}\{\text{minimal cost}(k\text{-th row}, (j-1)\text{-th column}) + \text{ride-quality cost}(k, i; LOC(k, j-1)) + \text{law-violating cost}(k, i; LOC(k, j-1)) + \text{pedestrian-threatening cost}(k, i; LOC(k, j-1)) + \text{pedestrian-injuring cost}(k, i, LOC(k, j-1))\}$$

Herein, LOC(k, j−1) may represent the location, the moving direction, the speed, and the braking distance of the autonomous vehicle in case at least part of the acceleration, the deceleration, and the steering corresponding to the action plan in a k-th row at a (j−1)-th step, that is, the minimal cost(k-th row, (j−1)-th column), is performed.

That is, according to the above equation, on condition that the location, the moving direction, the speed, and the braking distance of the autonomous vehicle correspond to those at LOC(k, j−1), the driving intention signaling device 100 may determine an action plan which minimizes increase in a cost of a lowered ride-quality, a cost of law violation, a cost of threatening a pedestrian, and a cost of injuring a pedestrian if at least part of the acceleration, the deceleration, and the steering corresponding to the action plan on an i-th row is performed at a j-th step.

Herein, (i) the ride-quality cost may be quantification of the lowered ride-quality that can be felt by the passenger caused by repeated acceleration/deceleration or lane-changing, (ii) the law-violating cost may be quantification of law violation such as exceeding a speed limit, crossing over a center divider, failure to stop for a pedestrian in a crosswalk, running a stop sign, crossing a solid line when changing lanes, etc. (iii) the pedestrian-threatening cost may be quantification of threats that can be felt by the pedestrian, and may be 0 if the autonomous vehicle is apart from the pedestrian more than the minimal distance S between the pedestrian and the autonomous vehicle for the pedestrian to feel safe, and may increase exponentially as the pedestrian nears the autonomous vehicle if the autonomous vehicle is apart from the pedestrian less than the minimal distance S and (iv) the pedestrian-injuring cost may be quantification of an expected injury of the pedestrian. And, an importance of each of the costs may be in the order of the pedestrian-injuring cost, the pedestrian-threatening cost, the law-violating cost, and the ride-quality cost.

Next, the driving intention signaling device 100 may perform a process of determining whether the specific pedestrian is paying attention to the autonomous vehicle by referring to one or more gaze patterns of the detected specific pedestrian using the surroundings video image around the autonomous vehicle, and a process of allowing the driving intention of the autonomous vehicle corresponding to the driving plan to be delivered to at least one of (i) the specific pedestrian and (ii) at least one driver of at least one nearby vehicle, via at least one of an external display 42 and an external speaker 43 installed on the autonomous vehicle if the specific pedestrian is determined as not paying attention to the autonomous vehicle.

That is, the driving intention signaling device 100 may confirm whether the specific pedestrian is paying attention to the specific autonomous vehicle at a step of S50, based on a direction in which the specific pedestrian is looking.

As one example, via head orientation estimation & gaze tracking, the driving intention signaling device 100 may perform a process of determining the specific pedestrian as not paying attention to the autonomous vehicle by referring to the gaze patterns of the specific pedestrian gazing at the autonomous vehicle, (i) if an accumulated sum of one or more gaze time sections during a 1-st preset reference time is equal to or less than a first preset threshold wherein each of the gaze time sections represents a time while a gaze of the specific pedestrian stays on the autonomous vehicle, or (ii) if the gaze of the specific pedestrian stays off the autonomous vehicle for a time equal to or greater than a second preset threshold after switching between staying on the autonomous vehicle and staying off the autonomous vehicle. Also, the driving intention signaling device 100 may perform a process of determining the specific pedestrian as paying attention to the autonomous vehicle, (iii) if the accumulated sum of the gaze time sections during the 1-st preset reference time is larger than the first preset threshold wherein each gaze time section represents a time while the gaze of the specific pedestrian stays on the autonomous vehicle, or (iv) if the gaze of the specific pedestrian stays on the autonomous vehicle for a time equal to or greater than a third preset threshold after switching between staying on the autonomous vehicle and staying off the autonomous vehicle. Herein, each of the 1-st preset reference time, the first preset threshold, the second preset threshold, and the third preset threshold may be fixed or may be varied, and the gaze time section may represent a time while the gaze stays on the autonomous vehicle.

As one example, the accumulated sum of the gaze time sections, during which the specific pedestrian is gazing at the autonomous vehicle, may be a summation of the gaze time sections during the 1-st preset reference time, for example, may be a summation of the gaze time sections during ten seconds.

And as another example, a most recent continuous gaze time section may be used for determining whether the specific pedestrian is gazing at the autonomous vehicle where only a last gaze time section is considered in case the specific pedestrian is currently gazing at the autonomous vehicle. That is, the most recent continuous gaze time section remains at 0 while the specific pedestrian is not currently gazing at the autonomous vehicle. And a most recent non-gaze time section may be used for determining whether the specific pedestrian is not gazing at the autonomous vehicle where only a last non-gaze time section is considered in case the specific pedestrian is currently not gazing at the autonomous vehicle. That is, the most recent non-gaze time section remains at 0 while the specific pedestrian is currently gazing at the autonomous vehicle. Herein, a non-gaze time section may represent a time while the gaze stays off the autonomous vehicle.

And, if the accumulated sum of the gaze time sections of the specific pedestrian gazing at the autonomous vehicle is equal to or greater than the first preset threshold, e.g., three seconds, the specific pedestrian may be determined as interested in the driving intention of the autonomous vehicle, or if the most recent continuous gaze time section of the specific pedestrian gazing at the autonomous vehicle is equal to or greater than the third preset threshold, e.g., one second, the specific pedestrian may be determined as interested in the driving intention of the autonomous vehicle.

And, if the accumulated sum of the gaze time sections of the specific pedestrian gazing at the autonomous vehicle is less than the 1-st preset reference time, e.g., three seconds, the specific pedestrian may be determined as not interested in the driving intention of the autonomous vehicle, or if the most recent continuous non-gaze time section of the specific pedestrian not gazing at the autonomous vehicle is equal to or greater than the second preset threshold, e.g., two seconds, the specific pedestrian may be determined as not interested in the driving intention of the autonomous vehicle.

And, if the specific pedestrian is determined as not paying attention to the autonomous vehicle, the driving intention signaling device 100 may generate at least one driving intention signal at a step of S60, and may allow the driving intention signal to be delivered to an outside via the external display 42 and the external speaker 43 of the autonomous vehicle. Herein, the driving intention signaling device 100 may directly transmit the driving intention signal to the external display 42 and the external speaker 43, or may transmit the driving intention signal to an external controller 41, to thereby allow the external controller 41 to deliver the driving intention signal to the outside using the external display 42 and the external speaker 43.

Figure 5:
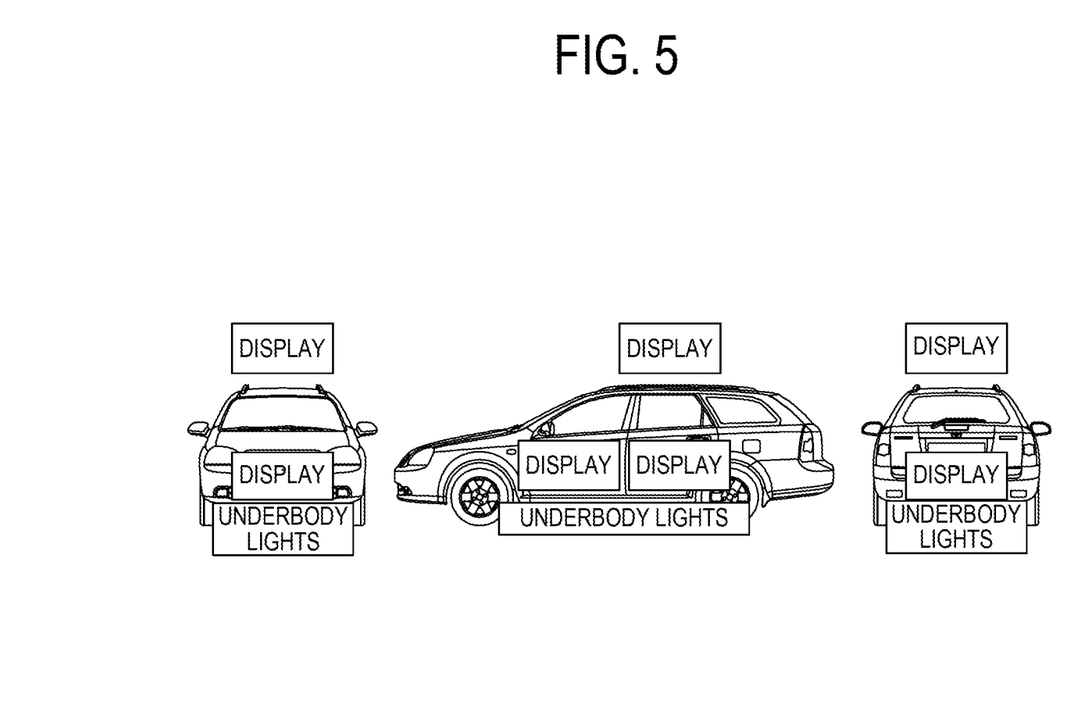
FIG. 5 is a drawing schematically illustrating a display of the autonomous vehicle to be used for signaling the driving intention in the method for signaling the driving intention of the autonomous vehicle in accordance with one example embodiment of the present disclosure.

Herein, by referring to FIG. 5, the external display of the autonomous vehicle may include at least one display and at least one underboby light installed on an outside of the autonomous vehicle.

Meanwhile, the driving intention signal may include at least part of preset colors, preset symbols, preset text, preset emojis, preset sound, etc. corresponding to the driving intention of the autonomous vehicle, and as a result, the specific pedestrian and passengers of other vehicles may recognize the driving intention of the autonomous vehicle.

Also, similar to confirmation of whether the specific pedestrian is paying attention, the driving intention signaling device 100 may check whether the passenger of the autonomous vehicle is paying attention at a step of S70, and may generate the driving intention signal, at the step of S60, corresponding to a result of the check, to thereby allow the passenger to recognize the driving intention of the autonomous vehicle.

That is, the driving intention signaling device 100 may perform a process of determining whether at least one passenger in the autonomous vehicle is paying attention to the nearby front area of the autonomous vehicle or to the specific pedestrian by referring to one or more gaze patterns of the passenger using at least one interior image taken by at least one internal camera shooting at an interior of the autonomous vehicle, and a process of, if the passenger is determined as not paying attention to the nearby front area of the autonomous vehicle or to the specific pedestrian, allowing the driving intention of the autonomous vehicle corresponding to the driving plan to be delivered to the passenger, via at least one of an internal display and an internal speaker installed on the autonomous vehicle.

As one example, if at least one interior video is acquired from the internal camera installed on the inside of the autonomous vehicle, the driving intention signaling device 100 may calculate, using the gaze tracking, (i) the accumulated sum of the gaze time sections of the passenger in the autonomous vehicle gazing at the nearby front area or the specific pedestrian intending to cross the roadway, (ii) the most recent continuous gaze time section and (iii) the most recent non-gaze time section.

Herein, the accumulated sum of the gaze time sections, during which the passenger in the autonomous vehicle is gazing at the nearby front area of the autonomous vehicle or at the specific pedestrian, may be a summation of the gaze time sections during a 2-nd preset reference time, for example, a summation of the gaze time sections during ten seconds.

As another example, the most recent continuous gaze time section may be used for determining whether the passenger in the autonomous vehicle is gazing at the nearby front area of the autonomous vehicle or at the specific pedestrian where only the last gaze time section is considered in case the passenger is currently gazing at the nearby front area of the autonomous vehicle or at the specific pedestrian. That is, the most recent continuous gaze time section remains at 0 while the passenger is currently not gazing at the nearby front area of the autonomous vehicle or at the specific pedestrian. And the most recent non-gaze time section may be used for determining whether the passenger is not gazing at the nearby front area of the autonomous vehicle or at the specific pedestrian where only the last non-gaze time section is considered in case the passenger is currently not gazing at the nearby front area of the autonomous vehicle or at the specific pedestrian. That is, the most recent non-gaze time section remains at 0 while the passenger is currently gazing at the nearby front area of the autonomous vehicle or at the specific pedestrian. Herein, the 2-nd preset reference time may be fixed or may be varied.

And, if the accumulated sum of the gaze time sections of the passenger gazing at the nearby front area of the autonomous vehicle or at the specific pedestrian is equal to or greater than a first predetermined threshold, e.g., three seconds, the passenger may be determined as interested in the driving intention of the autonomous vehicle, or if the most recent continuous gaze time section of the passenger gazing at the nearby front area of the autonomous vehicle or the specific pedestrian is equal to or greater than a second predetermined threshold, e.g., one second, the passenger may be determined as interested in the driving intention of the autonomous vehicle.

Also, if the accumulated sum of the gaze time sections of the passenger in the autonomous vehicle gazing at the nearby front area or the specific pedestrian is less than the 2-nd preset reference time, e.g., three seconds, the passenger may be determined as not interested in the driving intention of the autonomous vehicle, or if the most recent continuous non-gaze time section of the passenger in the autonomous vehicle not gazing at the nearby front area or the specific pedestrian is equal to or greater than a third predetermined threshold, e.g., two seconds, the passenger may be determined as not interested in the driving intention of the autonomous vehicle. Herein, each of the first predetermined threshold, the second predetermined threshold, and the third predetermined threshold may be fixed or may be varied.

Meanwhile, as one example, the driving intention signal of the autonomous vehicle may be generated as follows.

A driving situation of the autonomous vehicle may be set as follows.

a. A pedestrian is crossing the roadway/a pedestrian with an intention of crosswalking but not crosswalking yet is present/no pedestrian intending to crosswalk is present b. A pedestrian is paying attention to the driving intention of the autonomous vehicle/is not c. A pedestrian is paying attention to the autonomous vehicle/is not d. A passenger is paying attention to the nearby front area of the autonomous vehicle or to a pedestrian who is crossing or intending to cross the roadway in nearby front area of the autonomous vehicle/is not e. A lowered ride-quality for the passenger is expected/is not f. A law violation is expected/is not g. A reckless driving threatening the pedestrian is expected/is not h. An injury to the pedestrian is expected/is not i. The autonomous vehicle is decelerating/the autonomous vehicle is accelerating/the autonomous vehicle is maintaining its speed/the autonomous vehicle is stopped j. The autonomous vehicle is changing lanes to the left/the autonomous vehicle is changing lanes to the right/the autonomous vehicle is staying in a lane And, the driving intention signal corresponding to the above driving situation may be as follows.

a. (to the pedestrian) A pedestrian intending to cross is present, and the autonomous vehicle does not yet pose a threat to the pedestrian, but a fact is displayed that the autonomous vehicle is paying attention to the pedestrian.

b. (to the pedestrian, the passenger, and the drivers of other vehicles) A pedestrian intending to cross is present, and the autonomous vehicle is driving slowly or stopping in order not to pose a threat to the passenger.

c. (to the pedestrian, the passenger, and the drivers of other vehicles) A pedestrian intending to cross is present, and the autonomous vehicle is expected to pose a threat to the pedestrian, but the pedestrian is not paying attention to the autonomous vehicle, thus blinking a light and sounding a noisy alarm in order to draw attention.

d. (to the passenger, and the drivers of other vehicles) A pedestrian is crossing, and the autonomous vehicle is violating law unintentionally in order not to pose a threat to the passenger.

e. (to the passenger) A pedestrian is crossing, and the autonomous vehicle is lowering the ride quality unintentionally in order not to pose a threat to the passenger and not to violate law.

f. (to the passenger, and the drivers of other vehicles) A pedestrian is crossing, and the autonomous vehicle is changing lanes abruptly in order not to pose a threat to the passenger.

However, the driving situation and the driving intention described in the present disclosure are not limited thereto, and a variety of the driving situations and the driving intentions may be set.

And, according to the driving intention signal, (i) a blue light, a smiley symbol, and no sound may be used when the autonomous vehicle is intending to slow down safely or stop for a pedestrian crossing or intending to cross the roadway, (ii) a green light, a slowness symbol, and no sound may be used when the autonomous vehicle recognizes the pedestrian intending to cross the roadway and is conditionally intending to slow down or stop for the pedestrian beginning to cross the roadway, (iii) a red light, an exclamation point symbol, a stop symbol, and a sound alert may be used when the autonomous vehicle attempts an emergency braking in order to avoid collision with the pedestrian crossing the roadway, and (iv) a blinking yellow light, a danger symbol, and warning sound may be used when the autonomous vehicle recognizes the pedestrian intending to cross the roadway and requests the pedestrian not to cross the roadway, since collision is expected if the pedestrian crosses the roadway.

The present disclosure has an effect of allowing pedestrian-friendly automatic driving by notifying the pedestrian, the passenger, and the drivers of other vehicles of the driving intention of the autonomous vehicle, while being driven autonomously, over vehicle-to-human (V2H) communication when the autonomous vehicle is near the crosswalk.

The present disclosure has another effect of allowing the pedestrian or the passenger to recognize a current driving intention of the autonomous vehicle by acquiring optimal information to be used for signaling the current driving intention of the autonomous vehicle and by efficiently signaling the current driving intention of the autonomous vehicle to the pedestrian or the passenger, thus allowing the pedestrian, the passenger, the drivers of other vehicles to calm down, figure out and expect behaviors of the autonomous vehicle.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for signaling at least one driving intention of an autonomous vehicle, comprising:

(a) detecting, by a driving intention signaling device, one or more pedestrians located in an area in front of the autonomous vehicle by using at least one surroundings video image of the autonomous vehicle, and determining, by the driving intention signaling device, whether a specific pedestrian among the one or more pedestrians crosses a roadway where the autonomous vehicle is traveling by using a virtual crosswalk corresponding to one or more locations of the one or more pedestrians;

(b) if the specific pedestrian is determined as crossing the roadway:

estimating, by the driving intention signaling device, at least one crosswalking trajectory, corresponding to at least one expected path by which the specific pedestrian is to cross the roadway, by referring to at least one moving trajectory of the specific pedestrian;

setting, by the driving intention signaling device, at least one driving plan of the autonomous vehicle by referring to driving information of the autonomous vehicle and the at least one crosswalking trajectory; and allowing, by the driving intention signaling device, the autonomous vehicle to be driven according to the at least one driving plan;

(c) determining, by the driving intention signaling device, whether the specific pedestrian is paying attention to the autonomous vehicle by referring to one or more gaze patterns of the specific pedestrian using the at least one surroundings video image; and (d) if the specific pedestrian is determined as not paying attention to the autonomous vehicle, allowing, by the driving intention signaling device, the at least one driving intention of the autonomous vehicle corresponding to the at least one driving plan to be delivered to at least one of (i) the specific pedestrian, or (ii) at least one driver of at least one other vehicle, via at least one of an external display or an external speaker installed on the autonomous vehicle.

2. The method of claim 1, wherein, at one or both of step (c) and step (d), the driving intention signaling device (1) refers to the one or more gaze patterns of the specific pedestrian; and (2) determines that the specific pedestrian is not paying attention to the autonomous vehicle;

(i) an accumulated sum of one or more gaze time sections during a preset reference time is equal to or less than a first preset threshold, wherein each of the one or more gaze time sections represents a time while a gaze of the specific pedestrian stays on the autonomous vehicle, or (ii) the gaze of the specific pedestrian stays off the autonomous vehicle for a time equal to or greater than a second preset threshold after switching between staying on the autonomous vehicle and staying off the autonomous vehicle.

3. The method of claim 2, wherein the driving intention signaling device determines that the specific pedestrian is paying attention to the autonomous vehicle if;

(1) the accumulated sum of the one or more gaze time sections during the preset reference time is larger than the first preset threshold, wherein each of the one or more gaze time sections represents a time while the gaze of the specific pedestrian stays on the autonomous vehicle, or (2) the gaze of the specific pedestrian stays on the autonomous vehicle for a time equal to or greater than a third preset threshold after switching between staying on the autonomous vehicle and staying off the autonomous vehicle.

4. The method of claim 1, wherein, at the step of (a), on condition that (i) the virtual crosswalk has been created such that the virtual crosswalk includes first regions, corresponding to a width of the roadway, whose each side reaches from each boundary between the roadway and each sidewalk to a first distance toward said each sidewalk, and second regions which are additional regions chosen by referring to each certain point on said each of the first regions, and (ii) a central axis in a crosswise direction of the virtual crosswalk corresponds to a location of the specific pedestrian, the driving intention signaling device determines that the specific pedestrian is: (1) crossing the roadway if the specific pedestrian is located in one of the first regions, or (2) intending to cross the roadway if the specific pedestrian is located in one of the second regions.

5. The method of claim 1, wherein, at the step of (b), the driving intention signaling device refers to a moving velocity and an acceleration of the specific pedestrian and estimates the at least one crosswalking trajectory of the specific pedestrian by:

(i) using a constant acceleration model with a limited maximum speed in a primary spatial section far away from a termination point of crosswalking by more than a second distance toward the roadway, and (ii) by using the constant acceleration model with a preset negative acceleration and a constant moving direction of the specific pedestrian in a secondary spatial section from the termination point of crosswalking to less than the second distance toward the roadway.

6. The method of claim 1, further comprising setting, by the driving intention signaling device, the at least one driving plan by estimating a driving path, acceleration information, deceleration information, and steering information such that at least one of:

(1) the autonomous vehicle avoids the at least one crosswalking trajectory of the specific pedestrian, (2) the autonomous vehicle poses no apparent threat to the specific pedestrian, or (3) the autonomous vehicle violates no traffic regulations;

wherein the estimating is performed by referring to a location, a moving direction, a speed, and a braking distance of the autonomous vehicle.

7. The method of claim 6, wherein, on condition that a 1-st action plan to a j-th action plan corresponding to at least one of acceleration, deceleration, or steering of the autonomous vehicle are set, and on condition that n steps are set per preset time intervals, wherein j is an integer larger than 0, and n is an integer larger than 0, the driving intention signaling device sets the at least one driving plan of the autonomous vehicle by referring to a 1-st optimal action plan to an n-th optimal action plan, each of which is selected from the 1-st action plan to the j-th action plan at its corresponding each of the n steps, via repeating a process of estimating a specific action plan, as a k-th optimal action plan at a k-th step, which minimizes a pedestrian-injuring cost, a pedestrian-threatening cost, a law-violating cost, and a ride-quality cost among a 1-st piece of driving information to a j-th piece of the driving information of the autonomous vehicle, wherein the 1-st piece to the j-th piece of the driving information are expected to result respectively if the 1-st action plan to the j-th action plan are executed based on a (k−1)-th piece of the driving information of the autonomous vehicle corresponding to a (k−1)-th optimal action plan estimated at a (k−1)-th step, and wherein k is an integer larger than 0 and equal to or less than n.

8. The method of claim 1, wherein, at one or both of step (c) and step (d), the driving intention signaling device displays at least one of colors, symbols, text, or emojis corresponding to the at least one driving intention, via the external display.

9. The method of claim 1, wherein, at one or both of step (c) and step (d), the driving intention signaling device determines whether at least one passenger of the autonomous vehicle is paying attention to the area in front of the autonomous vehicle or the specific pedestrian by referring to one or more gaze patterns of the at least one passenger using at least one interior image of the autonomous vehicle, and wherein, if the passenger is determined as not paying attention to the area in front of the autonomous vehicle or the specific pedestrian, the driving intention signaling device allows the at least one driving intention of the autonomous vehicle corresponding to the at least one driving plan to be delivered to the passenger, via at least one of an internal display or an internal speaker installed on the autonomous vehicle.

10. A driving intention signaling device for signaling at least one driving intention of an autonomous vehicle, comprising:
at least one memory that stores instructions; and
at least one processor configured to execute the instructions to perform or support another device to perform:
(I) a process of detecting one or more pedestrians located in an area in front of the autonomous vehicle by using at least one surroundings video image of the autonomous vehicle, and a process of determining whether a specific pedestrian among the one or more pedestrians crosses a roadway where the autonomous vehicle is traveling by using a virtual crosswalk corresponding to one or more locations of the one or more pedestrians;
(II) if the specific pedestrian is determined as crossing the roadway;
(a) a process of estimating at least one crosswalking trajectory, corresponding to at least one expected path by which the specific pedestrian is to cross the roadway, by referring to at least one moving trajectory of the specific pedestrian,
(b) a process of setting at least one driving plan of the autonomous vehicle by referring to driving information of the autonomous vehicle and the at least one crosswalking trajectory, and
(c) a process of allowing the autonomous vehicle to be driven according to the at least one driving plan;
(III) a process of determining whether the specific pedestrian is paying attention to the autonomous vehicle by referring to one or more gaze patterns of the specific pedestrian using the at least one surroundings video image; and
(IV) a process of, if the specific pedestrian is determined as not paying attention to the autonomous vehicle, allowing the at least one driving intention of the autonomous vehicle corresponding to the at least one driving plan to be delivered to at least one of (IV-1) the specific pedestrian or (IV-2) at least one driver of at least one other vehicle, via at least one of an external display or an external speaker installed on the autonomous vehicle.

11. The driving intention signaling device of claim 10, wherein, at one or both of process (III) and process (IV), the processor performs (1) a process of referring to the one or more gaze patterns of the specific pedestrian; and (2) a process of determining that the specific pedestrian is not paying attention to the autonomous vehicle, if:
(i) an accumulated sum of one or more gaze time sections during a preset reference time is equal to or less than a first preset threshold, wherein each of the one or more gaze time sections represents a time while a gaze of the specific pedestrian stays on the autonomous vehicle, or
(ii) the gaze of the specific pedestrian stays off the autonomous vehicle for a time equal to or greater than a second preset threshold after switching between staying on the autonomous vehicle and staying off the autonomous vehicle.

12. The driving intention signaling device of claim 11, wherein the processor performs a process of determining that the specific pedestrian is paying attention to the autonomous vehicle if:
(1) the accumulated sum of the one or more gaze time sections during the preset reference time is larger than the first preset threshold, wherein each gaze time section represents a time while the gaze of the specific pedestrian stays on the autonomous vehicle, or
(2) if the gaze of the specific pedestrian stays on the autonomous vehicle for a time equal to or greater than a third preset threshold after switching between staying on the autonomous vehicle and staying off the autonomous vehicle.

13. The driving intention signaling device of claim 10, wherein, at the process of (I), on condition that:
(i) the virtual crosswalk has been created such that the virtual crosswalk includes first regions, corresponding to a width of the roadway, whose each side reaches from each boundary between the roadway and each sidewalk to a first distance toward said each sidewalk, and second regions which are additional regions chosen by referring to each certain point on said each of the first regions, and
(ii) a central axis in a crosswise direction of the virtual crosswalk corresponds to a location of the specific pedestrian,
the processor performs a process of determining that the specific pedestrian is: (1) crossing the roadway if the specific pedestrian is located in one of the first regions, or (2) intending to cross the roadway if the specific pedestrian is located in one of the second regions.

14. The driving intention signaling device of claim 10, wherein, at the process of (II), the processor performs a process of referring to a moving velocity and an acceleration of the specific pedestrian and estimating the at least one crosswalking trajectory of the specific pedestrian by:
(i) using a constant acceleration model with a limited maximum speed in a primary spatial section far away from a termination point of crosswalking by more than a second distance toward the roadway, and
(ii) using the constant acceleration model with a preset negative acceleration and a constant moving direction of the specific pedestrian in a secondary spatial section from the termination point of crosswalking to less than the second distance toward the roadway.

15. The driving intention signaling device of claim 10, wherein the processor performs a process of referring to a location, a moving direction, a speed, and a braking distance of the autonomous vehicle and setting the at least one driving plan by estimating a driving path, acceleration information, deceleration information, and steering information such that at least one of:
(i) the autonomous vehicle avoids the at least one crosswalking trajectory of the specific pedestrian,
(ii) the autonomous vehicle poses no apparent threat to the specific pedestrian, or
(iii) the autonomous vehicle violates no traffic regulations.

16. The driving intention signaling device of claim 15, wherein, on condition that a 1-st action plan to a j-th action plan corresponding to at least one of acceleration, deceleration, or steering of the autonomous vehicle are set, and on condition that n steps are set per preset time intervals, wherein j is an integer larger than 0, and n is an integer larger than 0, the processor performs a process of setting the at least one driving plan of the autonomous vehicle by referring to a 1-st optimal action plan to an n-th optimal action plan, each of which is selected from the 1-st action plan to the j-th action plan at its corresponding each of the n steps, via repeating a process of estimating a specific action plan, as a k-th optimal action plan at a k-th step, which minimizes a pedestrian-injuring cost, a pedestrian-threatening cost, a law-violating cost, and a ride-quality cost among a 1-st piece of driving information to a j-th piece of the driving information of the autonomous vehicle, wherein the 1-st piece to the j-th piece of the driving information are expected to result respectively if the 1-st action plan to the j-th action plan are executed based on a (k−1)-th piece of the driving information of the autonomous vehicle corresponding to a (k−1)-th optimal action plan estimated at a (k−1)-th step, and wherein k is an integer larger than 0 and equal to or less than n.

17. The driving intention signaling device of claim 10, wherein, at the process of (IV) the processor performs a process of displaying at least one of colors, symbols, text, or emojis corresponding to the at least one driving intention, via the external display.

18. The driving intention signaling device of claim 10, wherein, at one or both of the process of (III) and the process of (IV), the processor performs:
 (1) a process of determining whether at least one passenger of the autonomous vehicle is paying attention to the area in front of the autonomous vehicle or the specific pedestrian by referring to one or more gaze patterns of the at least one passenger using at least one interior image of the autonomous vehicle; and
 (2) a process of, if the passenger is determined as not paying attention to the area in front of the autonomous vehicle or the specific pedestrian, allowing the at least one driving intention of the autonomous vehicle corresponding to the at least one driving plan to be delivered to the passenger, via at least one of an internal display or an internal speaker installed on the autonomous vehicle.

* * * * *